Sept. 30, 1958 M. M. CUNNINGHAM 2,854,048
COLLAPSIBLE CONTAINER
Filed March 15, 1957 2 Sheets-Sheet 1
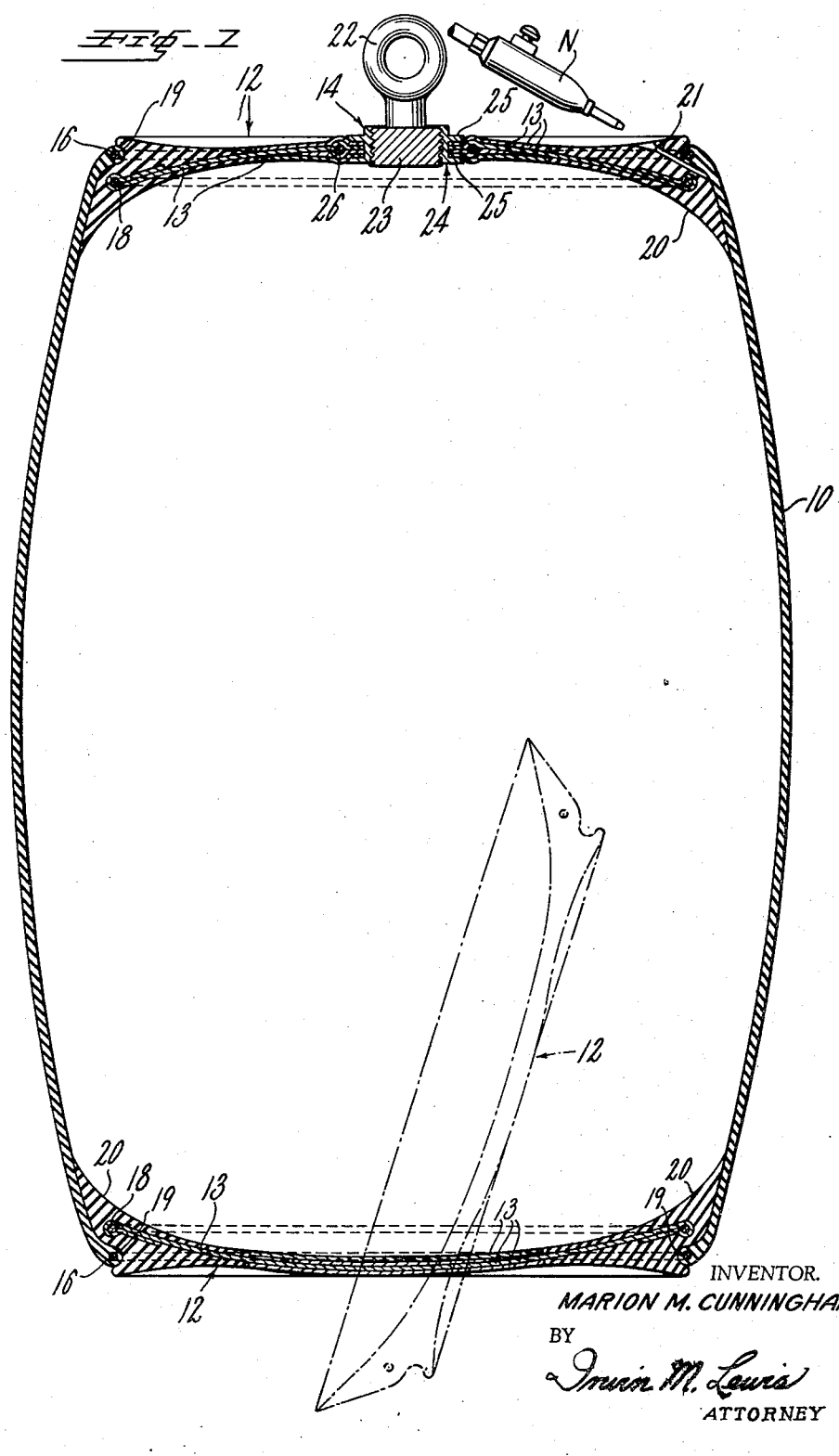
INVENTOR.
MARION M. CUNNINGHAM
BY
Irwin M. Lewis
ATTORNEY Sept. 30, 1958 M. M. CUNNINGHAM 2,854,048
COLLAPSIBLE CONTAINER
Filed March 15, 1957 2 Sheets-Sheet 2
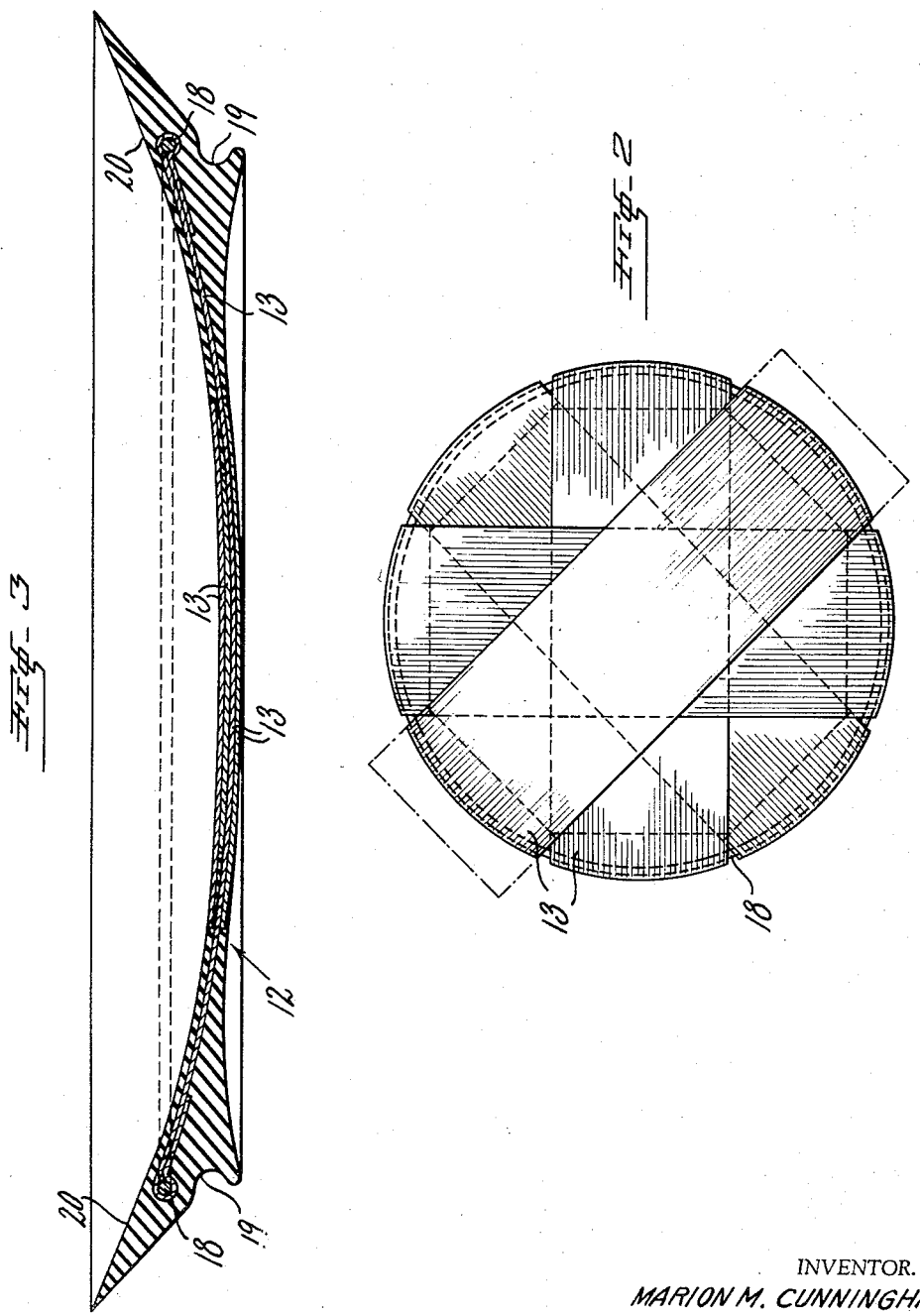
INVENTOR.
MARION M. CUNNINGHAM
BY
Irwin M. Lewis
ATTORNEY

United States Patent Office 2,854,048
Patented Sept. 30, 1958

2,854,048

COLLAPSIBLE CONTAINER

Marion M. Cunningham, Providence, R. I., assignor to United States Rubber Company, New York, N. Y., a corporation of New Jersey Application March 15, 1957, Serial No. 646,484

7 Claims. (Cl. 150—.5)

This invention relates to collapsible shipping containers and particularly to collapsible shipping containers formed of plies of flexible, rubberized cord fabric.

The primary object of the invention is to provide a container structure which permits the head and body portions of the container to be fabricated and cured separately prior to assembly. This allows the body portion, which has a shape similar to that of an uncured tire carcass, to be fabricated on and cured in conventional, or slightly modified, tire building equipment. This has not been possible with containers of this general type heretofore proposed, as the structure thereof necessitated the fabrication and assembling of the head and body portions prior to curing.

Other objects and advantages of the present invention will be apparent from the following description when read in conjunction with the accompanying drawings wherein:

Fig. 1 is a sectional view of a container constructed in accordance with the present invention;

Fig. 2 is a plan view of a partially formed head portion for the container illustrated in Fig. 1; and Fig. 3 is an enlarged sectional view of one of the head portions of the container illustrated in Fig. 1.

Referring to the drawings, the body portion of the container is generally designated by the reference numeral 10 and the head portions by the reference numeral 12.

Both the body portion 10 and the head portions 12 are formed of rubberized, i. e. rubber coated or rubber impregnated, cord fabric of the type commonly used for tires or containers of this general type. The cord fabric may be formed of textile cords, either natural or synthetic, or metallic wire cords.

The body portion 10 is formed with two or more plies of said rubberized cord fabric, the cord fabric being bias cut and laminated so that the cords of adjacent plies extend at an angle to each other, preferably as described in U. S. Patent No. 2,672,902. Preferably, the body portion is formed to have a barrel shape, i. e. to have a larger center or bilge diameter than end or chine diameters. It has been found that when a container is so shaped it will stand upright and not collapse even under the weight of the usual equipment for filling the container.

As best shown in Fig. 3 the head portions 12 are also formed of rubberized cord fabric, conveniently applied in the form of diagonally extending strips 13. This construction provides a plurality of ply thicknesses at the center of the head portions, thereby providing excellent reinforcing for attachment of various type fittings, such as the fitting 14 as shown in Fig. 1, by which the container may be lifted.

In accordance with the invention, each of the open ends of the body portion 10 are reinforced with circular, substantially axially inextensible, laterally resilient bead rings 16 formed of metal or other suitable material. The bead rings 16 may be either a single ring, a plurality of rings, or a continuously wound coil or bundle of wires similar to that used for the beads of pneumatic tires.

The rubberized cord fabric of the body portion 10 may be conveniently anchored to the bead rings 16 by wrapping the cord fabric around the bead rings and adhering the cord fabric on itself during subsequent curing or vulcanization.

The head portions 12 are similarly reinforced adjacent their peripheries by circular, substantially axially incompressible, either laterally rigid or resilient bead rings 18 around which the cord fabric strips 13 are wrapped and adhered during subsequent curing. The bead rings 18 may be in the form of a single ring, a plurality of rings, a continuous coil or bundle of wire, or a tightly wound helical spring.

In accordance with the invention, the bead rings 18 have an outer diameter greater than the inner diameter of the bead rings 16. The head portions 12 are installed in the ends of the body portion after fabrication and curing of the body and head portions, by inserting the head portions through the open ends of the body portion as indicated in dash dot lines in Fig. 1 and forcing them into the position as shown in full lines of Fig. 1. Such insertion of the head portions 12, which have a larger diameter than the open ends of the body portion 10, is accomplished by distortion of the normally circular, resilient bead rings 16 of the body portion to an elliptical shape. This distortion is permissible by reason of the resiliency of the bead rings 16. The fitting 14 may be used to pull the upper head portion 12 into place after the lower head portion 12 has been installed.

Once the head portions are installed in proper position, the bead rings 16 return to their normal circular shape due to their resiliency and overlie the bead rings 18 of the head portions 12 so that the head portions are effectively anchored against outward expulsion. So effective is this anchoring of the head portions 12 that the container may be pressurized with gas without expulsion of the heads, and the container may be lifted, when filled by means of a suitable fitting, such as the fitting 14, secured to the center of one of the heads.

Either or both of the head portions 12 may be permanently installed by applying a suitable adhesive to the edges thereof prior to installation so that the heads become permanently secured to the body portion. If desired, the heads may be left unadhered to permit removal.

The head portions 12 are preferably provided with external edge grooves 19 into which the bead ring 16 extend upon installation of the head portions. This helps to hold the bead rings 16 concentric with the bead rings 18 and prevents accidental displacement of the head portions inwardly of the body portions. The material in which the grooves 19 are formed is preferably resilient, such as a resilient rubber and the grooves 19 preferably have a minimum diameter slightly greater than the inner diameter of the end openings of the body portion 10 to thereby provide some sealing action at these points.

The head portions 12 are also preferably provided with internal lips 20 formed of resilient material, such as resilient rubber. These lips 20 are preferably molded to have an outer diameter slightly greater than the diameter of the body portion 10 so that when the head portions 12 are installed in the open ends of the body portion 10, the lips 20 press against the wall of the body of the container to form an additional seal. This sealing is further enhanced by pressure within the container acting against the lips 20 to press them against the wall of the body portion 10. The lips 20 also aid in holding the bead rings 18 concentric with the bead rings 16.

A passageway 21 extending from the outer surface of the head portion 12 through the outer surface of the lip 20 may be provided through which the container may be inflated or pressurized with gas by means of a suitable nozzle, such as shown at N, after the container has been filled. The gas from the nozzle N passes between the container wall and lip 20 and is prevented from leaking out after removal of the nozzle N by the pressure thereof within the container acting against the sealing lip 20. Inflating or pressurizing the container makes the container rigid to facilitate the handling thereof.

While the particular fitting 14 shown in Fig. 1 includes an eye bolt 22, it will be appreciated that other types of fittings may be used, e. g. a pivotally mounted D-ring. As shown in Fig. 1, the eye bolt 22 is provided with a threaded shank 23 which threads into a sleeve 24. Removal of the eye bolt 22 permits filling and emptying of the container through the sleeve 24 without removal of the head portion 12, if such is desired. Sleeve 24 may be conveniently secured to the head portion by crimping flanges 25 in the manner described in my copending United States patent application, Serial No. 277,998, filed March 22, 1952. A reinforcing ring 26 may also be provided as described in my U. S. Patent No. 2,559,064. If desired the eye bolt 22 may be replaced with a screw plug (not shown) and the container pressurized with gas through the loosened threads of the plug using the tool shown in my U. S. Patent No. 2,690,284.

From the above description it can be seen that there is provided a collapsible container structure which permits completed fabrication and curing of the body portion and the head portion separately before assembling. This allows the body portion to be fabricated on and cured in conventional or slightly modified tire building equipment. For example, the body portion may be fabricated from bias cut plies of uncured rubberized cord fabric on a conventional tire building drum and the bead rings 16 applied by means of conventional tire bead setting apparatus. The fabricated body portion may be conveniently cured in a slightly modified diaphragm type tire press of the type shown in U. S. Patent 2,243,532 or a more modernized version thereof as sold by the McNeil Machine & Engineering Company of Akron, Ohio, under the trade mark "Bag-O-Matic". The modification of the press consists essentially of substituting mold members of the desired container shape in place of the conventional tire molds. The press may be used to expand the fabricated body portion to the barrel shape as shown in Fig. 1 and cure it in this shape.

While certain embodiments of the present invention have been shown and described, it is to be understood that this is for the purpose of illustration only and that modifications and changes may be made therein without departing from the spirit and scope of the invention. The term "rubber" or "rubberized" is used herein in its generic sense to include natural rubber, synthetic rubber, blends thereof, and other plastic materials exhibiting rubber-like properties.

Having thus described my invention, what I claim and desire to protect by Letters Patent is:

1. A collapsible container having a generally cylindrical body portion and head portions closing each end thereof, said body portion and said head portions being formed of flexible rubberized cord fabric, said ends of said body portion being reinforced by normally circular substantially inextensible resilient bead rings to which the cord fabric of the body is anchored, said head portions being reinforced adjacent their peripheries by normally circular substantially incompressible bead rings to which the cord fabric of said head portions are anchored, the bead rings reinforcing said head portions having an outer diameter greater than the inner diameter of said bead rings reinforcing said ends of said body portion, the peripheral portions of said head portions containing said bead rings being positioned inwardly of said ends of said body portion with the bead rings of said head portions underlying and substantially concentric with the bead rings of said ends of said body portion whereby said head portions are anchored against outward expulsion, said head portions being insertible in said ends of the body portion after fabrication and curing of said head portions and body portion by temporary distortion of said normally circular resilient bead rings reinforcing said ends of said body portion.

2. A container as defined in claim 1 in which the head portions have a peripheral edge groove into which the portions of said ends of said body portion containing said bead rings extend.

3. A container as defined in claim 1 in which the head portions have circumferentially continuous in-turned resilient lips which press against the internal wall of the container.

4. A container as defined in claim 3 in which said lips are molded to have a maximum diameter when uncompressed greater than the inner diameter of said body portion adjacent said ends thereof whereby when said head portions are installed said lips press against the internal wall of the container.

5. A container as defined in claim 1 in which the head portions have a peripheral edge groove into which the peripheries of said ends of said body portion containing said bead rings extend, and each of the head portions have a circumferentially continuous in-turned resilient lip which presses against the internal wall of the container.

6. A container as defined in claim 1 in which the head portions have circumferentially continuous in-turned resilient ilps which press against the wall of the container and at least one head portion is provided with a passageway which extends from the outer surface of said head portion through the surface of the lip thereof which presses against the wall of the container.

7. A container as defined in claim 1 in which the cord fabric is applied in the form of a plurality of diagonally laid strips.

References Cited in the file of this patent

UNITED STATES PATENTS

| 2,622,645 | Pfleumer | Dec. 23, 1952 |
| 2,672,902 | Prager | Mar. 23, 1954 |